United States Patent
Goncalves

(10) Patent No.: US 10,781,742 B2
(45) Date of Patent: Sep. 22, 2020

(54) CONDENSATE DRAIN VALVE FOR CHARGE AIR COOLER

(71) Applicant: Eduardo F Goncalves, Troy, MI (US)

(72) Inventor: Eduardo F Goncalves, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/218,653

(22) Filed: Dec. 13, 2018

(65) Prior Publication Data

US 2020/0191047 A1    Jun. 18, 2020

(51) Int. Cl.
*F02B 29/04*    (2006.01)

(52) U.S. Cl.
CPC ...... *F02B 29/0468* (2013.01); *F02B 29/0406* (2013.01)

(58) Field of Classification Search
CPC ............. F02B 29/0468; F02B 29/0406; Y02T 10/144; Y02T 10/146; F02M 35/10255
See application file for complete search history.

(56) References Cited

U.S. PATENT DOCUMENTS

| | | | |
|---|---|---|---|
| 3,854,526 A * | 12/1974 | Cole | B60T 17/004 165/71 |
| 6,681,171 B2 | 1/2004 | Rimnac et al. | |
| 7,251,937 B2 | 8/2007 | Appleton | |
| 9,334,791 B2 | 5/2016 | Glugla et al. | |
| 9,638,094 B2 * | 5/2017 | Cardwell | F02B 29/0468 |
| 2008/0190079 A1 | 8/2008 | Cerdes | |
| 2010/0077995 A1 | 4/2010 | Buia et al. | |
| 2011/0094219 A1 | 4/2011 | Palm | |
| 2011/0107760 A1 | 5/2011 | Quinn et al. | |
| 2014/0109568 A1 | 4/2014 | Glugla et al. | |
| 2014/0158096 A1 | 6/2014 | Leone et al. | |
| 2015/0167539 A1 | 6/2015 | Basile et al. | |
| 2015/0285128 A1 | 10/2015 | Cardwell et al. | |

(Continued)

FOREIGN PATENT DOCUMENTS

| | | | | |
|---|---|---|---|---|
| DE | 102013005847 A1 * | 10/2014 | .......... | F02B 29/0468 |
| FR | 2941291 A1 * | 7/2010 | .......... | F02B 29/0468 |

(Continued)

OTHER PUBLICATIONS

FR-2941291-A1—Gantelmo Jean Claude (filed Jul. 2010) English Translation (Year: 2010).*

*Primary Examiner* — Mark A Laurenzi
*Assistant Examiner* — Jessica L Kebea
(74) *Attorney, Agent, or Firm* — Ralph E Smith

(57) ABSTRACT

A liquid drain valve assembly for a charge air cooler includes a valve housing configured to couple to the charge air cooler, the valve housing having a condensate inlet configured to receive condensate from the charge air cooler, and a condensate outlet, a valve mechanism slidingly disposed within the valve housing and configured to selectively close the condensate inlet and the condensate outlet to facilitate preventing charge air from leaking during condensate draining, and a diaphragm assembly disposed within the valve housing and configured to selectively engage the valve mechanism to selectively open the condensate inlet and the condensate outlet to drain condensate from the charge air cooler when the charge air cooler is in a boosted condition and isolated from the atmosphere.

16 Claims, 4 Drawing Sheets

(56) References Cited

U.S. PATENT DOCUMENTS

| | | | | |
|---|---|---|---|---|
| 2015/0300511 A1* | 10/2015 | Fima | ................... | F16K 15/148 |
| | | | | 137/512 |
| 2016/0223098 A1* | 8/2016 | McAuliffe | .............. | F16K 21/00 |
| 2018/0135925 A1* | 5/2018 | Tang | .................... | F28F 17/005 |
| 2018/0298809 A1* | 10/2018 | Myers | ................ | F02B 29/0468 |

FOREIGN PATENT DOCUMENTS

| | | | | | |
|---|---|---|---|---|---|
| JP | 2000130172 A | * | 5/2000 | .......... | F02B 29/0468 |
| JP | 2009215904 A | * | 9/2009 | | |

\* cited by examiner

CONDENSATE DRAIN VALVE FOR CHARGE AIR COOLER

FIELD

The present application relates generally to combustion engine charge air coolers, and more particularly, to a condensate drain valve for a combustion engine charge air cooler.

BACKGROUND

Some internal combustion engines include a turbocharger or supercharger configured to compress ambient air in order to increase power. Compressing the ambient air causes an increase in its air temperature, resulting in a decrease in engine power due to the intake of high temperature air. In order to cool the high temperature air, an intercooler or charge air cooler is often utilized between the turbocharger/supercharger and an intake manifold of the engine. By reducing the temperature of the ambient air, its density is increased thereby allowing the engine to produce more power.

However, as the high temperature air passes through the charge air cooler and is cooled, liquid condensate may form and collect inside the charge air cooler under certain conditions. There is an opportunity for the collected condensate to subsequently freeze inside the charge air cooler in low temperature ambient conditions, and/or to accumulate chemical impurities that may potentially corrode the charge air cooler. Moreover, when engine torque is increased during acceleration or other similar conditions, the resulting increased mass airflow operates to potentially draw the collected condensate into an intake manifold and/or engine, which presents an opportunity for the condensate to freeze or increase the chance of engine misfire and combustion instability. Accordingly, while conventional charge air cooler systems do work well for their intended purpose, there remains a need for improvement in the art.

SUMMARY

In one example aspect of the invention, a liquid drain valve assembly for a charge air cooler is provided. In one example implementation, the assembly includes a valve housing configured to couple to the charge air cooler, the valve housing having a condensate inlet configured to receive condensate from the charge air cooler, and a condensate outlet, a valve mechanism slidingly disposed within the valve housing and configured to selectively close the condensate inlet and the condensate outlet to facilitate preventing charge air from leaking during condensate draining, and a diaphragm assembly disposed within the valve housing and configured to selectively engage the valve mechanism to selectively open the condensate inlet and the condensate outlet to drain condensate from the charge air cooler when the charge air cooler is in a boosted condition and isolated from the atmosphere.

In addition to the foregoing, the described assembly may include one or more of the following: wherein the valve housing further includes a dry chamber and a wet chamber; wherein the valve mechanism is disposed at least partially within the wet chamber; wherein the valve mechanism comprises a stem, a charge air cooler (CAC) drain valve, and a wet chamber drain valve; wherein the condensate inlet includes a condensate inlet port defining a valve seat; and wherein the CAC drain valve is disposed within the condensate inlet port and configured to selectively seal against the valve seat.

In addition to the foregoing, the described assembly may include one or more of the following: wherein the valve mechanism further includes a biasing mechanism configured to bias the CAC drain valve into a closed position sealing the condensate inlet from the wet chamber; and wherein the wet chamber drain valve is disposed within the wet chamber and configured to selectively seal against the diaphragm assembly.

In addition to the foregoing, the described assembly may include one or more of the following: wherein the diaphragm assembly is disposed in the dry chamber; wherein the diaphragm assembly comprises a diaphragm coupled to a piston, the diaphragm sealed against an inner wall of the valve housing and movable between a first position where the piston is unseated from the valve mechanism, a second position where the piston is sealed against the valve mechanism, and a third position where the piston is sealed against the valve mechanism and enables fluid flow from the condensate inlet into the wet chamber; and a pressure line coupled between the dry chamber and the charge air cooler, wherein the diaphragm is moved to: the first position when the charge are cooler is in a boosted pressure condition, the second position when the charge air cooler is in an atmospheric pressure condition, and the third position when the charge air cooler is in a vacuum pressure condition.

In accordance with another example aspect of the invention, a vehicle is provided. In one example implementation, the vehicle includes an internal combustion engine, an air intake conduit configured to supply air to the internal combustion engine, a charger fluidly coupled to the air intake conduit and configured to selectively supply compressed charge air to the engine via the air intake conduit during a boosted condition, a charge air cooler coupled to the air intake conduit and configured to receive the compressed charge air, the charge air cooler configured to cool the compressed charge air before the compressed charge air is supplied to the engine, and a liquid drain valve assembly coupled to the charge air cooler and configured to selectively drain condensate from the charge air cooler.

The liquid drain valve assembly includes a valve housing having a condensate inlet configured to receive condensate from the charge air cooler, and a condensate outlet, a valve mechanism slidingly disposed within the valve housing and configured to selectively close the condensate inlet and the condensate outlet to facilitate preventing charge air from leaking during condensate draining, and a diaphragm assembly disposed within the valve housing and configured to selectively engage the valve mechanism to selectively open the condensate inlet and the condensate outlet to drain condensate from the charge air cooler when the charge air cooler is in a boosted condition and isolated from the atmosphere.

In addition to the foregoing, the described vehicle may include one or more of the following: wherein the valve housing further includes a dry chamber and a wet chamber, and the valve mechanism comprises a stem, a charge air cooler (CAC) drain valve, and a wet chamber drain valve; wherein the condensate inlet includes a condensate inlet port defining a valve seat, and wherein the valve mechanism is disposed partially within the wet chamber and partially within the condensate inlet port; wherein the CAC drain valve is disposed within the condensate inlet port and configured to selectively seal against the valve seat; and wherein the valve mechanism further includes a biasing mechanism configured to bias the CAC drain valve into a closed position sealing the condensate inlet from the wet chamber.

In addition to the foregoing, the described vehicle may include one or more of the following: wherein the wet chamber drain valve is disposed within the wet chamber and configured to selectively seal against the diaphragm assembly; wherein the diaphragm assembly comprises a diaphragm coupled to a piston, the diaphragm sealed against an inner wall of the valve housing and movable between a first position where the piston is unseated from the valve mechanism, a second position where the piston is sealed against the valve mechanism, and a third position where the piston is sealed against the valve mechanism and enables fluid flow from the condensate inlet into the wet chamber; and a pressure line coupled between the dry chamber and the charge air cooler, wherein the diaphragm is moved to: the first position when the charge are cooler is in a boosted pressure condition, the second position when the charge air cooler is in an atmospheric pressure condition, and the third position when the charge air cooler is in a vacuum pressure condition.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

The present application is generally directed to systems and methods for draining liquid condensate directly from a charge air cooler (CAC) only when the intake manifold is under vacuum pressure to prevent loss of boost. The liquid condensate is then drained from a liquid drain valve assembly when the CAC is under boosted pressures and isolated from the atmosphere. In one example, the liquid drain valve assembly includes a wet chamber, a dry chamber, and a valve mechanism that is actuated by the pressure imbalance inherent to the charge system (i.e., vacuum and boost pressure). The dry chamber includes a flexible actuator that moves up or down under boost or vacuum pressures. The dry chamber is in communication with the intake manifold or anywhere in the system where both boost and vacuum pressures are available. The dry chamber has a center hollow passage which forms a chimney between the wet chamber and the outside, and also serves as a seal interface that separates the wet and dry chamber via an O-ring. The valve mechanism includes two valves, a wet chamber drain valve and a CAC drain valve. The wet chamber drain valve is designed to close before the CAC drain valve opens to ensure there is never a leak path between the CAC boosted air and the outside.

Figure 1:
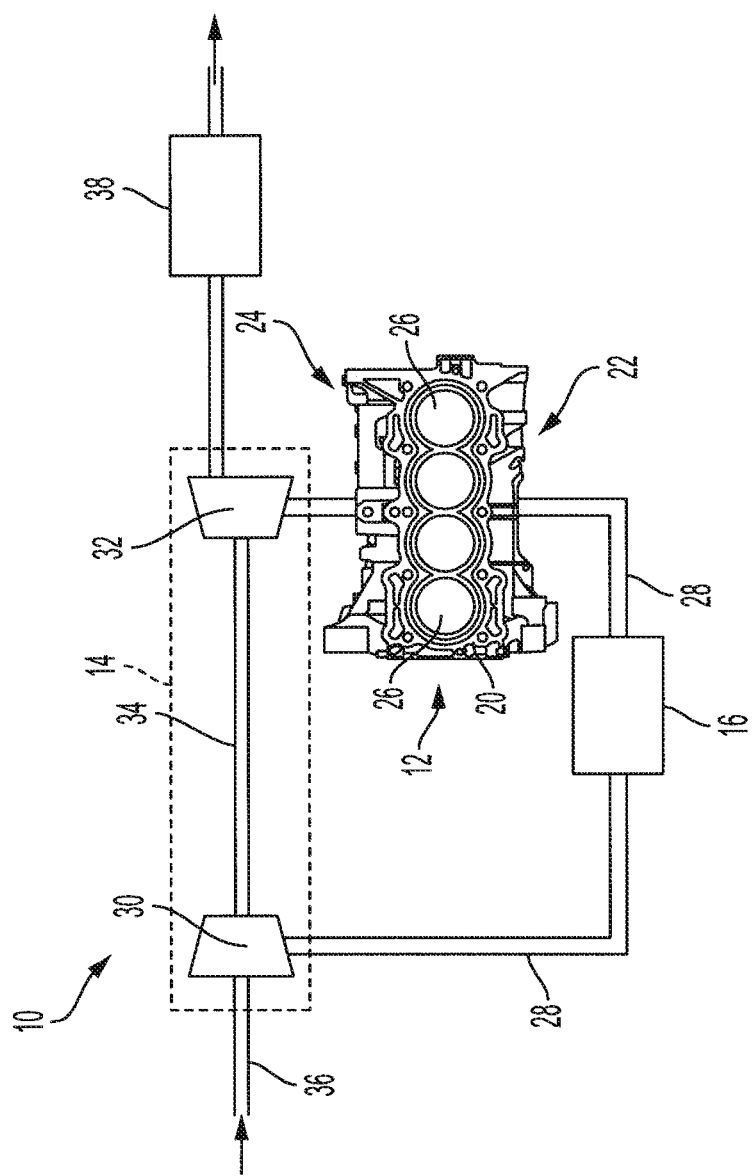
FIG. 1 is a schematic illustration of an example engine and air intake system, in accordance with the principles of the present disclosure.

With reference to FIG. 1, an example internal combustion engine system 10 is illustrated in accordance with one example of the present disclosure. The internal combustion engine system 10 generally includes an internal combustion engine 12, a charger 14, and an intercooler or charge air cooler 16. Engine 12 includes an engine block 20 having an intake manifold 22, an exhaust manifold 24, and a plurality of cylinders 26 configured to combust a mixture of air and fuel therein. Intake manifold 22 is in fluid communication with cylinders 26 and is configured to provide air from an air intake conduit 28 to the engine 12. Exhaust manifold 24 is in fluid communication with cylinders 26 and is configured to receive exhaust gas therefrom.

In the illustrated example, charger 14 is a turbocharger. However, it will be appreciated that charger 14 may be a supercharger or any similar device configured to compress intake air supplied to engine 12. As shown, turbocharger 14 generally includes a compressor 30 coupled to a turbine 32 via a shaft 34. As is well known, exhaust gas from engine 12 rotates turbine 32, which operates compressor 30 (via shaft 34) to compress air drawn through an air inlet 36. The compressed charge air is then supplied through air intake conduit 28 to charge air cooler 16, where the hot compressed charge air is subsequently cooled in direct or indirect heat exchange with a coolant. The cooled charge air is subsequently supplied to engine 12 via intake manifold 22 where it is mixed with fuel and combusted in cylinders 26. The resulting exhaust gas is exhausted via exhaust manifold 24 to turbine 32 and eventually to an exhaust gas treatment system 38.

Figure 2:
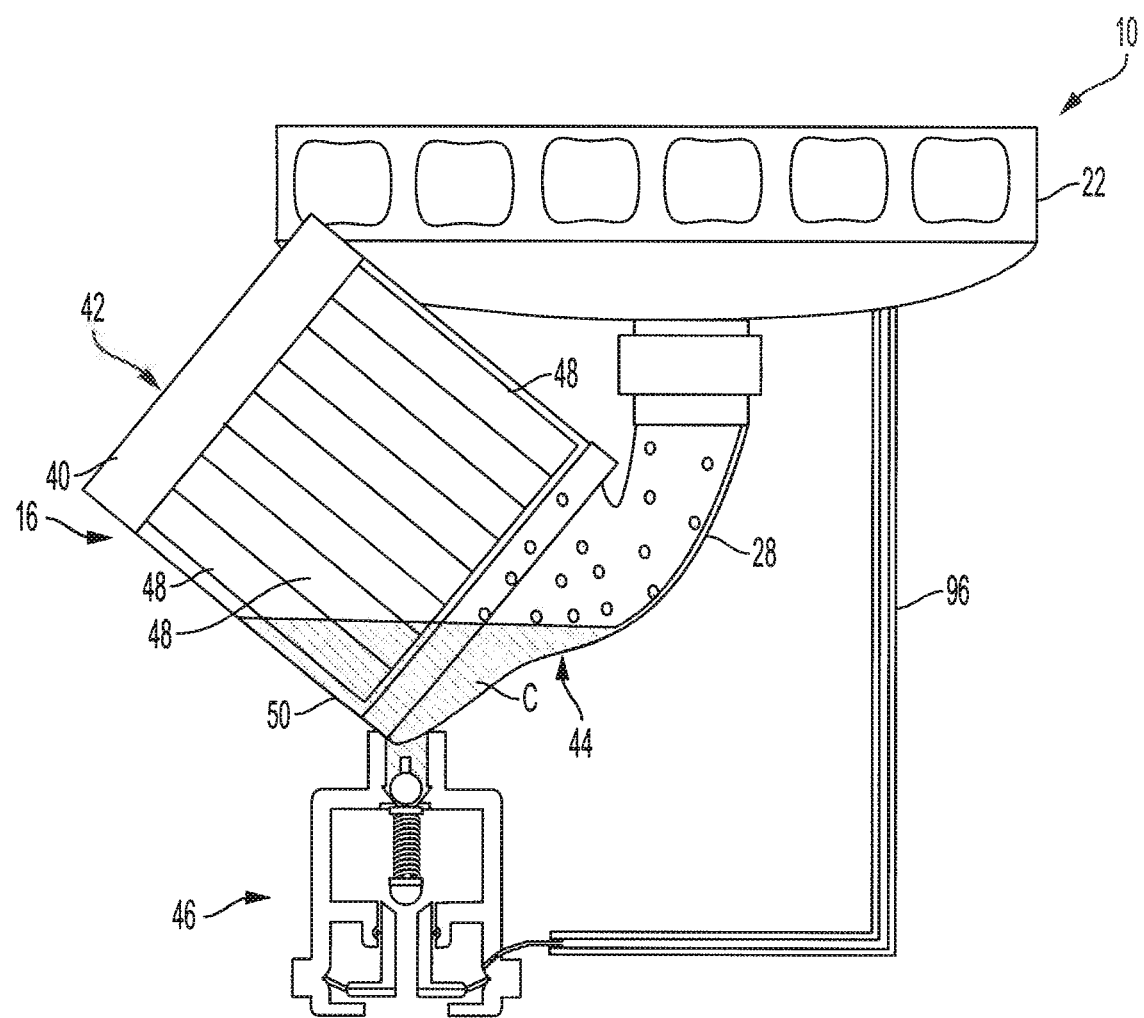
FIG. 2 is a schematic cross-sectional view of an example charge air cooler and liquid drain valve assembly, in accordance with the principles of the present disclosure.
Figure 4:
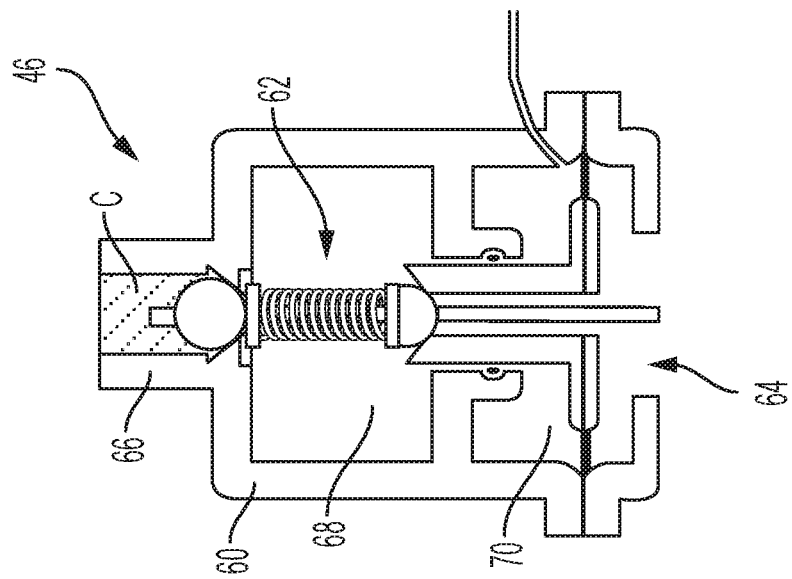
FIG. 4 is a cross-sectional view of the liquid drain valve assembly shown in FIG. 2 in an atmospheric pressure position, in accordance with the principles of the present disclosure.
Figure 3:
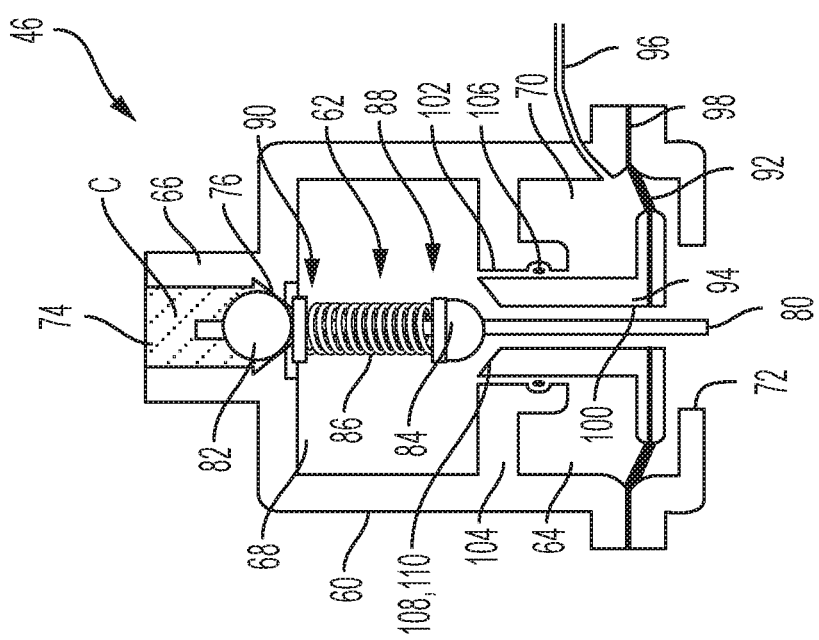
FIG. 3 is a cross-sectional view of the liquid drain valve assembly shown in FIG. 2 in a boosted pressure position, in accordance with the principles of the present disclosure.

With further reference to FIG. 2, in the example embodiment, charge air cooler 16 generally includes a housing 40 having an air inlet 42, an air outlet 44, and a liquid drain valve assembly 46. Air inlet 42 is configured to receive compressed air from turbocharger 14, and the compressed air is subsequently passed over a plurality of coolant passages 48, which receive a flow of coolant (e.g., air, water, refrigerant) therein. The coolant cools the hot compressed air, and the resulting cooled compressed air is then directed through air outlet 44 toward intake manifold 22 and engine 12.

In some cases, moisture contained in the compressed air is condensed during the cooling process and is directed by gravity toward a reservoir 50 disposed at a lower portion of housing 40 such that the condensate 'C' from the compressed air can be collected. As shown in FIG. 2, liquid drain valve assembly 46 is coupled to the housing 40 proximate reservoir 50 and is configured to selectively drain the condensate from charge air cooler 16. In one example embodiment, liquid drain valve assembly 46 is threadably coupled to housing 40 such that liquid drain valve assembly 46 can be quickly assembled to charge air cooler 16 or removed therefrom for replacement or servicing. In other configurations where valve assembly 46 is not coupled to charge air cooler 16, a drain line (not shown) may be added to connect the valve assembly 46 and CAC 16.

With reference to FIGS. 2-6, liquid drain valve assembly 46 generally includes a valve housing 60, a valve mechanism 62, and a diaphragm assembly 64. The valve housing 60 defines a condensate inlet port 66, a wet chamber 68, a dry chamber 70, and a condensate outlet 72.

In the illustrated example, condensate inlet port 66 is configured to couple to CAC housing 40 and defines a condensate inlet 74 and a valve seat 76. The wet chamber 68 is fluidly coupled to the condensate inlet port 66 and generally houses the valve mechanism 62. The dry chamber 70 generally houses the diaphragm assembly 64. The condensate outlet 72 is fluidly coupled to the wet chamber 68 and is configured to selectively drain condensate therefrom.

In the example embodiment, valve mechanism 62 generally includes a rigid stem 80, a CAC drain valve 82, a wet chamber drain valve 84, and a biasing mechanism 86 (e.g., a spring). Valve mechanism 62 is a double action valve configured to keep charge air from leaking during condensate draining. The CAC drain valve 82 is coupled to the rigid stem 80 and is disposed in the condensate inlet port 66. The CAC drain valve 82 is configured to selectively seat against the valve seat 76 to facilitate preventing condensate from traveling from the condensate inlet port 66 to the wet chamber 68.

The wet chamber drain valve 84 is coupled to the rigid stem 80 and is disposed in the wet chamber 68. The wet chamber drain valve 84 is configured to selectively seat against the diaphragm assembly 64 to facilitate preventing condensate from traveling from the wet chamber 68 to the condensate outlet 72, as described herein in more detail. In the illustrated example, the biasing mechanism 86 is disposed between the CAC drain valve 82 and the wet chamber drain valve 84. A biasing mechanism first end 88 is disposed against the wet chamber drain valve 84, and an opposite second end 90 is disposed against the valve housing 60 such that biasing mechanism 86 is configured to bias valve mechanism 62 downward into a closed position when not actuated (shown in FIGS. 2 and 3) where CAC drain valve 82 is seated in the valve seat 76.

In the example embodiment, the diaphragm assembly 64 generally includes a diaphragm 92, a piston 94, and a pressure conduit or line 96. The diaphragm 92 is coupled to or operatively sealed with the piston 94. An outer perimeter or circumference 98 of the diaphragm 92 is coupled to or generally sealed against the valve housing 60 (e.g., inner wall). In the illustrated example, the diaphragm outer circumference 98 is disposed between upper and lower portions of the valve housing 60.

The piston 94 includes a condensate port 100 which is slidingly received within an aperture 102 formed in an intermediate valve housing wall 104 that separates the wet chamber 68 and the dry chamber 70. A seal 106 (e.g., an O-ring) is disposed in the intermediate valve housing wall 104 to facilitate fluid sealing between the valve housing 60 and the piston 94. A piston upper end 108 defines a valve seat 110 configured to selectively seal against the wet chamber drain valve 84.

In the example embodiment, the pressure line 96 is a fluid conduit extending between the dry chamber 70 and the intake manifold 22 or other portion of the system where both boost and vacuum pressures are available. In this way, intake manifold pressures are imparted to the sealed dry chamber 70 via the pressure line 96. For example, if the intake manifold 22 experiences vacuum intake pressure, the dry chamber 70 will also experience vacuum intake pressure. If the intake manifold 22 experiences boosted intake pressure, the dry chamber 70 will similarly experience boosted intake pressure. Accordingly, the pressure occurring in the intake manifold 22 and thus the dry chamber 70, causes flexing of the diaphragm 92. This movement translates piston 94, which selectively engages and causes subsequent movement of the valve mechanism 62, as described herein in more detail.

With continued reference to FIGS. 3-6, one example operation of valve assembly 46 is described. Valve assembly 46 may begin in the closed position shown in FIG. 3. The engine 12 is boosted such that turbocharger 14 supplies compressed charge air to the charge air cooler 16 via air intake conduit 28, which increases the pressure in charge air cooler 16, intake manifold 22, and pressure line 96. This increase in pressure acts on diaphragm 92 and forces it downward such that piston 94 is drawn away from the wet chamber drain valve 84.

In this valve closed position, the biasing mechanism 86 biases the CAC drain valve 82 into sealed engagement with valve seat 76, thereby isolating the charge air cooler 16 from the atmosphere. During the boosted condition, the hot compressed charge air is cooled against coolant passages 48 and condensate formed therefrom is subsequently directed toward a low point of the manifold (i.e., reservoir 50) and condensate inlet port 66 where the condensate 'C' is collected against the sealed CAC drain valve 82.

Once turbocharger 14 no longer provides compressed charge air to the charge air cooler 16 (e.g., engine idling, engine off, etc.) and the pressure in charge air cooler 16 approaches or reaches atmospheric pressure, diaphragm 92 flexes back to a flat open (i.e., unloaded) position (FIG. 4), thereby forcing piston 94 upward (as shown in the figure) such that valve seat 110 is sealed against the wet chamber drain valve 84. As such, both the CAC and wet chamber drain valves 82, 84 are closed and the wet chamber 68 is isolated from the atmosphere.

Figure 5:
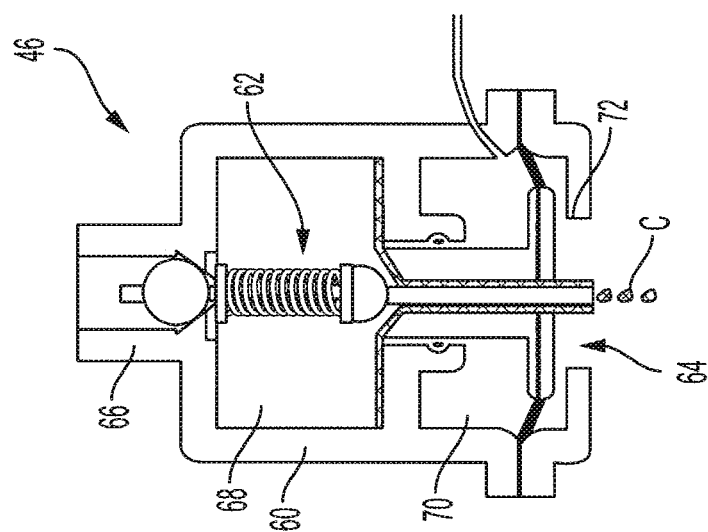
FIG. 5 is a cross-sectional view of the liquid drain valve assembly shown in FIG. 2 in a vacuum pressure position, in accordance with the principles of the present disclosure.
Figure 6:
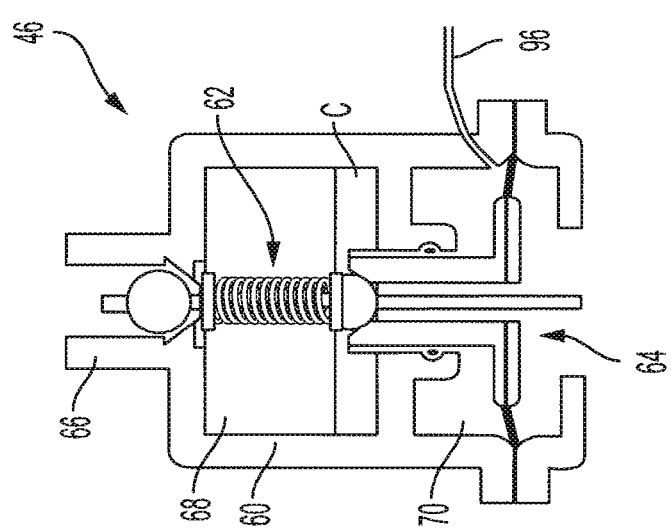
FIG. 6 is a cross-sectional view of the liquid drain valve assembly shown in FIG. 2 in another boost pressure position, in accordance with the principles of the present disclosure.

Once a vacuum pressure is generated in the intake manifold 22 (e.g., foot on the brake pedal, throttle valve closed), diaphragm 92 is flexed upward into the position shown in FIG. 5, thereby forcing the valve mechanism 62 upward such that CAC drain valve 82 is unseated from valve seat 76. Although not shown, the throttle valve can be located between the air intake conduit 28 and the intake manifold 22. As such, the CAC drain valve 82 is open, while the wet chamber drain valve 84 remains closed. In this position, the condensate 'C' collected in reservoir 50 and inlet port 66 is drained into the wet chamber 68 (see FIG. 5). It will be appreciated that boosted air cannot reach the wet chamber 70 except via the intake manifold 22 and pressure line 96, since a boosted pressure inside the CAC 16 will only serve to increase the seal pressure between the CAC drain valve 82 and the seal surface 76.

Upon the next boosted condition where turbocharger 14 supplies compressed charge air to the charge air cooler 16 via air intake conduit 28, the pressure is increased in charge air cooler 16, the intake manifold 22 (provided the throttle valve is open), and fluid pressure line 96. This increase in pressure flexes diaphragm 92 downward, drawing piston 94 away from the wet chamber drain valve 84 and unseating the drain valve 84 from the piston valve seat 110. As such, biasing mechanism 46 biases the CAC drain valve 82 into the closed position and the wet chamber drain valve 84 is opened. Accordingly, the condensate 'C' collected in the wet chamber 68 is free to flow through piston condensate port 100 and out through condensate outlet 72, thereby ridding charge air cooler 16 of condensate that could corrode cooler housing 40, freeze in housing 40, and/or be drawn into the intake manifold 22 or engine 12. Moreover, the double action valve enables draining of condensate without leaking boost pressure to the atmosphere.

Described herein are systems and methods for a valve assembly configured to drain condensate collected in a charge air cooler. The valve assembly includes a double action valve mechanism slidingly disposed within a valve housing defining separate wet and dry chambers. A diaphragm is flexed based on the pressure in the intake manifold to selectively open and close the wet and dry chambers to drain the condensate. The system is configured to use boost and vacuum pressure imbalances inherent to the system to passively drain condensate from the CAC only when intake manifold is under vacuum pressure to prevent loss of boost.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A liquid drain valve assembly for a vehicle air intake having a charge air cooler, the assembly comprising:
   a valve housing configured to couple to the charge air cooler, the valve housing having a condensate inlet configured to receive condensate from the charge air cooler, a wet chamber configured to receive condensate from the condensate inlet, a dry chamber, and a condensate outlet;
   a valve mechanism slidingly disposed within the valve housing and configured to selectively close at least one of the condensate inlet and the condensate outlet to facilitate preventing charge air from leaking while draining the condensate from the charge air cooler;
   a diaphragm assembly disposed in the dry chamber and configured to selectively engage the valve mechanism to selectively open the condensate outlet to drain condensate from the wet chamber when the charge air cooler is in a boosted condition and isolated from the atmosphere via the valve housing and
   a pressure line configured to fluidly couple the dry chamber and the charge air cooler, wherein when the charge air cooler is in the boosted condition, air intake pressures are imparted to the dry chamber via the pressure line to thereby cause flexing of the diaphragm assembly and the opening of the condensate outlet by the selective engagement with the valve mechanism.

2. The assembly of claim 1, wherein the valve mechanism is disposed at least partially within the wet chamber.

3. The assembly of claim 2, wherein the valve mechanism comprises a stem, a charge air cooler (CAC) drain valve, and a wet chamber drain valve.

4. The assembly of claim 3, wherein the condensate inlet includes a condensate inlet port defining a valve seat.

5. The assembly of claim 4, wherein the CAC drain valve is disposed within the condensate inlet port and configured to selectively seal against the valve seat.

6. The assembly of claim 3, wherein the valve mechanism further includes a biasing mechanism configured to bias the CAC drain valve into a closed position sealing the condensate inlet from the wet chamber.

7. The assembly of claim 3, wherein the wet chamber drain valve is disposed within the wet chamber and configured to selectively seal against the diaphragm assembly.

8. The assembly of claim 1, wherein the diaphragm assembly comprises a diaphragm coupled to a piston, the diaphragm sealed against an inner wall of the valve housing and movable between a first position where the piston is unseated from the valve mechanism, a second position where the piston is sealed against the valve mechanism, and a third position where the piston is sealed against the valve mechanism and enables fluid flow from the condensate inlet into the wet chamber, wherein at least a portion of the piston is disposed inside of the dry chamber and, wherein the piston includes a condensate port which is slidingly received within an aperture formed in an intermediate valve housing wall that separates the wet chamber and the dry chamber.

9. A liquid drain valve assembly for a charge air cooler, the assembly comprising:
   a valve housing configured to couple to the charge air cooler, the valve housing having a condensate inlet configured to receive condensate from the charge air cooler, and a condensate outlet;
   a valve mechanism slidingly disposed within the valve housing and configured to selectively close at least one of the condensate inlet and the condensate outlet to facilitate preventing charge air from leaking during condensate draining;
   a diaphragm assembly disposed within the valve housing and configured to selectively engage the valve mechanism to selectively open the condensate inlet to drain condensate from the charge air cooler when the charge air cooler is in a vacuum condition and isolated from the atmosphere via the valve housing;
   wherein the valve housing further includes a dry chamber and a wet chamber;
   wherein the diaphragm assembly is disposed in the dry chamber;
   wherein the diaphragm assembly comprises a diaphragm coupled to a piston, the diaphragm sealed against an inner wall of the valve housing and movable between a first position Where the piston is unseated from the valve mechanism, a second position where the piston is sealed against the valve mechanism, and a third position where the piston is sealed against the valve mechanism and enables fluid flow from the condensate inlet into the wet chamber; and
   a pressure line coupled between the dry chamber and the charge air cooler, wherein the diaphragm is moved to: the first position when the charge air cooler is in a boosted pressure condition, the second position when the charge air cooler is in an atmospheric pressure condition, and the third position when the charge air cooler is in a vacuum pressure condition.

10. A vehicle comprising: an internal combustion engine; an air intake conduit configured to supply air to the engine;
   a charger fluidly coupled to the air intake conduit and configured to selectively supply compressed charge air to the engine via the air intake conduit during a boosted condition;

a charge air cooler coupled to the air intake conduit and configured to receive the compressed charge air, the charge air cooler configured to cool the compressed charge air before the compressed charge air is supplied to the engine; and a liquid drain valve assembly coupled to the charge air cooler and configured to selectively drain condensate from the charge air cooler, the liquid drain valve assembly comprising:

a valve housing having, a condensate inlet configured to receive condensate from the charge air cooler, and a condensate outlet;

a valve mechanism slidingly disposed within the valve housing and configured to selectively close at least one of the condensate inlet and the condensate outlet to facilitate preventing charge air from leaking during condensate draining;

a diaphragm assembly disposed within a dry chamber of the valve housing and configured to selectively engage the valve mechanism; and a pressure line fluidly coupled between the dry chamber and the charge air cooler, wherein air intake line pressures are imparted to the dry chamber via the pressure line to thereby cause flexing of the diaphragm assembly to selectively open the condensate outlet to facilitate draining condensate from a wet chamber of the valve housing when the charge air cooler is in the boosted condition and isolated from the atmosphere via the valve housing.

11. The vehicle of claim 10, wherein the valve mechanism comprises a stem, a charge air cooler (CAC) drain valve, and a wet chamber drain valve.

12. The vehicle of claim 11, wherein the condensate inlet includes a condensate inlet port defining a valve seat, and wherein the valve mechanism is disposed partially within the wet chamber and partially within the condensate inlet port.

13. The vehicle of claim 12, wherein the CAC drain valve is disposed within the condensate inlet port and configured to selectively seal against the valve seat.

14. The vehicle of claim 13, wherein the valve mechanism further includes a biasing mechanism configured to bias the CAC drain valve into a closed position sealing the condensate inlet from the wet chamber.

15. The vehicle of claim 14, wherein the wet chamber drain valve is disposed within the wet chamber and configured to selectively seal against the diaphragm assembly.

16. The vehicle of claim 10, wherein the diaphragm assembly comprises a diaphragm coupled to a piston, wherein the diaphragm is sealed against an inner wall of the valve housing, wherein at least a portion of the piston is disposed inside of the dry chamber, wherein the piston includes a condensate port Which is slidingly received within an aperture formed in an intermediate valve housing wall that separates the wet chamber and the dry chamber wherein: (i) when the dry chamber is under the boosted condition, the valve mechanism seals the condensate inlet and diaphragm is moved to a first position where the diaphragm assembly does not engage the valve mechanism; (ii) when the dry chamber is under an atmospheric pressure condition, the diaphragm is moved to a second position where the diaphragm assembly, seals against the valve mechanism to seal the condensate outlet, and the valve mechanism seals the condensate inlet; and (iii) when the dry chamber is under a vacuum pressure condition, the diaphragm is moved to a third position where the diaphragm assembly seals against the valve mechanism, and moves the valve mechanism such that the condensate inlet is opened.

* * * * *